United States Patent

Yamanaka

[15] 3,702,518

[45] Nov. 14, 1972

[54] AUTOMATIC GRINDING APPARATUS FOR MAGNETIC HEADS

[72] Inventor: Sadajiro Yamanaka, Chigasaki, Japan

[73] Assignee: Yugen Kaisha Yamanaka Seisakusho, Chigasaki-shi, Japan

[22] Filed: June 30, 1970

[21] Appl. No.: 51,101

[30] Foreign Application Priority Data

July 15, 1969 Japan ......................44/56018

[52] U.S. Cl. ........................51/165.8, 51/96, 51/267
[51] Int. Cl. ............................................B24b 51/00
[58] Field of Search......51/165.8, 165.77, 165 R, 96, 51/124, 267

[56] References Cited

UNITED STATES PATENTS

| | | | |
|---|---|---|---|
| 775,708 | 11/1904 | Norton | 51/267 |
| 1,862,583 | 6/1932 | Skriba | 51/267 |
| 2,212,179 | 8/1940 | Martin | 51/96 |
| 2,275,483 | 3/1942 | Parker | 51/96 UX |
| 2,340,843 | 2/1944 | Bailey | 51/165 R |
| 2,367,850 | 1/1945 | Dusevoir | 51/96 X |

*Primary Examiner*—Harold D. Whitehead
*Attorney*—Stevens, Davis, Miller & Mosher

[57] ABSTRACT

An oscillating shaft for holding a magnetic head to be worked is mounted on a reciprocating table in opposed relation to a rotary grinding wheel. The reciprocating table is controllably moved toward the grinding wheel, whereby the magnetic head is ground by the grinding wheel. During the grinding operation, the magnetic impedance of the magnetic head being worked is continuously measured and the grinding operation is automatically stopped when the measured impedance has reached a predetermined value.

2 Claims, 6 Drawing Figures

INVENTOR
SADAJIRO YAMANAKA
BY
Stevens, Davis, Miller & Mosher
ATTORNEYS

INVENTOR
SADAJIRO YAMANAKA
BY
Stevens, Davis, Miller & Mosher
ATTORNEYS

AUTOMATIC GRINDING APPARATUS FOR MAGNETIC HEADS

The present invention relates to an apparatus for grinding magnetic heads used in magnetic tape recorders, electronic computers and other electronic equipments.

This type of magnetic head includes an electromagnet which comprises a core having the opposite ends arranged in confronting relation defining a slight gap therebetween, and a coil wound on said core. The magnetic impedance of the electromagnet is variable depending upon the thickness of the core at the end portions which define the slight gap. In the production of the magnetic head, it is particularly important to work the core so as to obtain a desired value of impedance. Further, in ordinary magnetic heads, the electromagnet is accommodated in a casing, with the gap portion thereof being exposed through one end of said casing, and a magnetic tape is passed on said end of the casing while being maintained in contact therewith. In this case, it is also important to grind the end of the casing in a predetermined shape which is so selected as will facilitate the slippage of the magnetic tape thereon.

Heretofore, the grinding of this type of magnetic head has been effected by a method wherein the magnetic head is gripped by hand and urged against a rotating grinding wheel. Namely, the grinding operation is continued while measuring the magnetic impedance from time to time repeatedly, until the predetermined value of impedance is obtained. Therefore, such conventional method is quite unsatisfactory in that the operation efficiency is very low and the products vary considerably from one another in dimension and moreover the effect of the heat generated during the grinding operation is not taken into account at all.

Thus, the development of an automatic machine is desired which is operative in such a manner that the magnetic impedance is measured while the grinding operation is in process, and the grinding operation is automatically stopped when the measured impedance has reached a predetermined value. However, there are problems which should be solved before the materialization of such an automatic machine. For instance, in the automatic grinding operation by means of an automatic machine, the grinding speed is higher than that in the manual grinding operation, and consequently the effect of heat is more critical. Therefore, cooling water is used during the grinding operation. In some cases, the cooling water intrudes into the terminal portion of the head, causing an electrical shorting of the terminals and making it impossible to measure the impedance. Furthermore, in the electromagnet of the magnetic head described above the gap in the core is so small and is of the order of about 1$\mu$ that the gap is liable to be filled with the burr formed at the end faces of the gap, when the magnetic head is ground at a high speed by an automatic machine.

The present invention has for its object the provision of an automatic grinding apparatus for magnetic heads which is completely free of the foregoing problems and operates positively with high efficiency.

A preferred embodiment of the automatic grinding apparatus according to the present invention will be described hereunder with reference to the accompanying drawings, in which.

Figures 1, 2, 3:
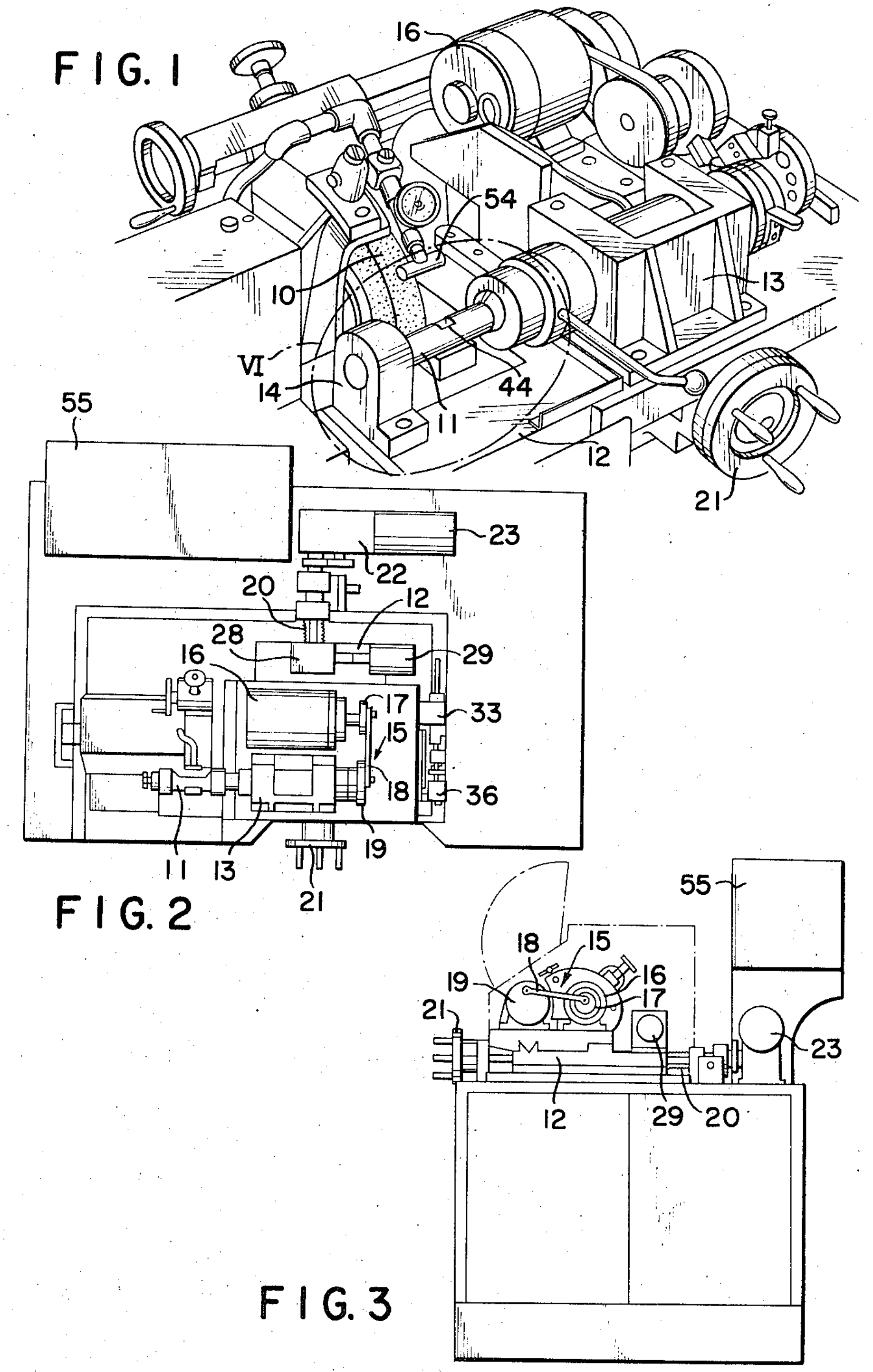
FIG. 1 is a perspective view of an embodiment of the apparatus of the invention, with a cover removed to show the principal portion thereof.
FIG. 2 is a plan view of the apparatus of FIG. 1.
FIG. 3 is a side view of the apparatus looking to the right of FIG. 1.

Referring to FIG. 1, a disc-shaped rotary grinding wheel 10 is rotatably mounted on a stationary frame of the machine, with the axis thereof extending horizontally, and is driven from a suitable motor (not shown). Opposite to the grinding surface of the grinding wheel 10 is provided a shaft 11 for holding a workpiece, that is, a magnetic head, which is supported on a reciprocating table 12 by means of brackets 13, 14. The reciprocating table 12 is mounted on the stationary frame of the machine for reciprocal movement in a transverse direction of said stationary frame. The workpiece holding shaft 11 is caused to oscillate by the drive of a motor 16, transmitted thereto through a crank mechanism shown in FIGS. 2 and 3. Namely, the crank mechanism 15 includes a link 18 having one end eccentrically connected to a disc 17 fixed on the drive shaft of the motor 16, with the other end connected to a disc 19 fixed to one end of the shaft 11. The amount of eccentricity of the point on the disc 17 where the link 18 is connected, is smaller than that on the disc 19. Therefore, when the drive shaft of the motor 16 is continuously rotated, an oscillation is imparted to the disc 19 and, therefore, to the shaft 11. The reciprocating table 12 is transversely reciprocally mounted on the stationary frame of the machine by means of a guide rail structure (the detail of which is not apparent in the drawings) well known in the art.

Figures 4, 5:
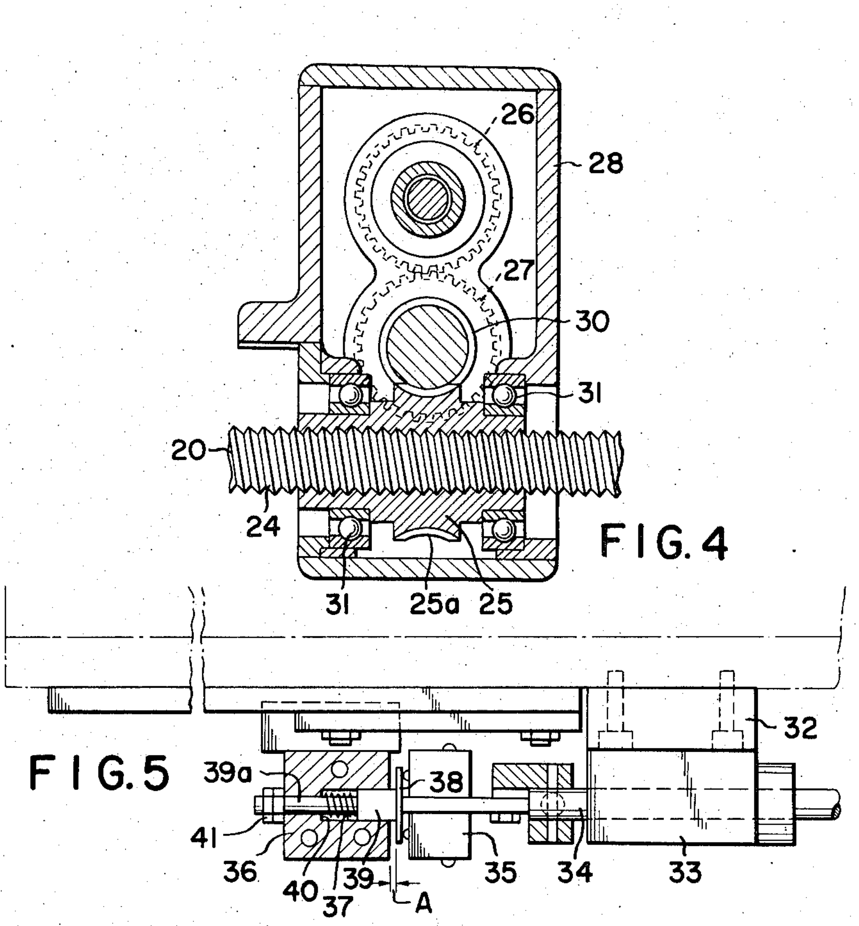
FIG. 4 is a cross-sectional view showing a portion of the reciprocating table driving mechanism.
FIG. 5 is a plan view showing the feed speed changing mechanism for the reciprocating table.

A mechanism for moving the reciprocating table 12 in a transverse direction includes a feed shaft 20 extending transversely and rotatably supported on the frame. This feed shaft 20 has one end slightly projecting forwardly from the front end of the machine and a handle 21 is fixedly connected to the projecting end. The other end of the feed shaft 20 is operatively connected to a motor 23 through a reduction gear 22. As shown in FIG. 4, the feed shaft 20 has a threaded portion 24 which is in meshing engagement with an internal thread formed in a gear 25. Further, on the reciprocating table 12 is fixedly mounted a gear box 28 having intermeshing gears 26, 27 therein. The gear 26 is driven from a motor 29. The gear 27 has a gear 30 fixed thereon or integrally formed therewith in concentric relation. The gear 30 is meshing with an external thread 25*a* formed on the gear 25. In FIG. 4, reference numeral 31 designates bearings by which the gear 25 is rotatably mounted on the reciprocating table 12.

With the construction described above, when the motor 23 is set in motion, the feed shaft 20 is rotationally driven through the reduction gear 22, and the gear 25, in meshing engagement with said feed shaft 20, and hence the reciprocating table 12 are moved transversely of the machine. On the other hand, when the motor 29 is set in motion, with the motor 23 being held inoperative, the drive of said motor 29 is transmitted to the gear 25 through the gears 26, 27 and 30, and thus the reciprocating table 12 is similarly moved transversely of the machine. The rated r.p.m.s' of the motors 23, 29 and the gear ratio of the reduction gears 22, 28 are so suitably selected that the reciprocating table 12 is fed at a relatively high speed when the motor 23 is actuated, and at a relatively low speed when the motor 29 is actuated.

A mechanism for selectively actuating the motors 23 and 29 is shown in FIG. 5 in detail. This mechanism includes a switch mounting rod 34 frictionally supported by a holder, provided on a bracket 32 fixed on the frame, in such a manner that it is reciprocable in the longitudinal direction thereof but will not make a casual movement, and a switch 35 is mounted on the forward end of said rod 34. Means for actuating the switch 35 consists of a block 36 fixed to the reciprocating table 12 and having a cylindrical bore 37 formed therein, and a shaft 39 having a switch operating plate 38 at one end thereof is disposed in said bore 37. The shaft 39 is urged outwardly by a compression coil spring 40 provided within the bore 37. The switch operating plate 38 defines a gap A between it and an end face of the block 36. The amount of the gap A can be adjusted by an adjusting nut 41 which is threadably mounted on the outwardly projecting end of a small diameter extension **39*a* of the shaft 39 and in engagement with the other end face of the block 36**. The operational feature of the construction described above will be described later.

Figure 6:
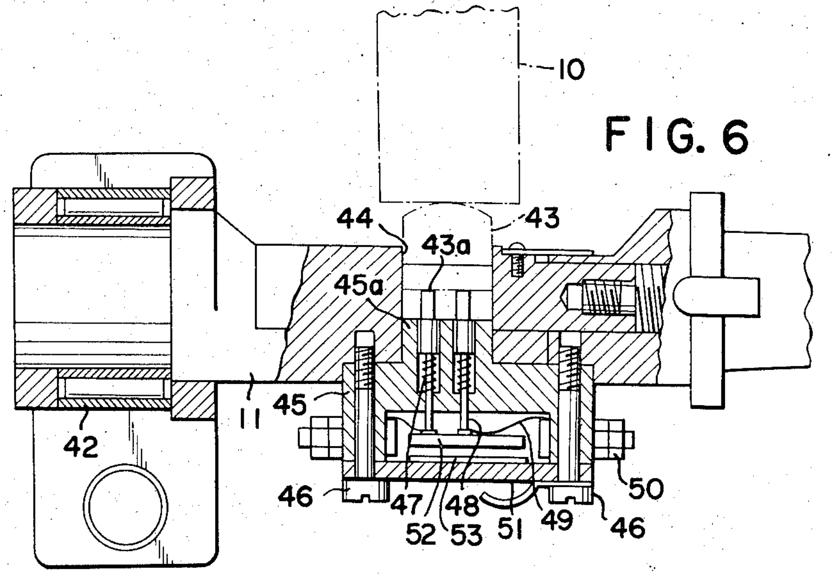
FIG. 6 is a view, partially in cross-section, showing the detail of the workpiece holding shaft.

FIG. 6 shows the detail of the workpiece holding shaft 11, and is a plan view, partially cut away, of the encircled portion VI in FIG. 1. As shown, the holding shaft 11 has its free end rotatably supported by a bearing block 42 and a socket hole 44 is formed transversely through the shaft 11 at an intermediate portion thereof, for mounting a workpiece, i.e., a magnetic head 43, therein. The magnetic head 43 is inserted into the socket hole from one end thereof, while a socket block 45 is fixed to the other end of the socket hole 44 by screws 46. The socket block 45 is a hollow box-shaped body open at one end face and made of a non-conductive plastic material. On the other end face of the socket block, opposite to the open end face, is formed a boss **45*a* adapted to be received in the socket hole 44. A suitable number of terminal pins 48, each being biased by a spring 47, extend through the boss 45*a* and are held in contact with a terminal 43a of the magnetic head 43 at each end thereof. Each of the terminal pins 48 is connected to a terminal bolt 50 by a lead wire 49 and thence to a control circuit. The open end face of the socket block 45 is closed with a cover 51, and a drain slot 52 and a drain channel 53 are formed in the side walls of the block 45. Reference numeral 54 in FIG. 1 designates a nozzle for splashing cooling water over the grinding region and reference numeral 55 in FIG. 2** designates a control box in which the control circuit is housed.

The apparatus of the invention, constructed as described above, operates in the following manner:

First of all, the workpiece, i.e., the unground magnetic head 43, is mounted in the socket hole 44 in the holding shaft 11, in the manner shown in FIG. 6, and then a starting switch (not shown) is closed. The grinding wheel 10 starts rotating and at the same time, cooling water is sprayed over the grinding region from the nozzle 54. Concurrently, the motor 23 is set in motion and the reciprocating table 12 is fed at a high speed. When the surface to be worked of the magnetic head 43 has been brought to a position in which it is substantially in contact with the grinding wheel 10, the switch operating plate 38 engages the microswitch 35 to actuate the same. The motor 23 stops and concurrently the motor 29 is set in motion, so that the reciprocating table 12 is advanced at a relatively low speed and the surface of the magnetic head 43 is ground by the grinding wheel 10. During the grinding operation, a current is conducted through the magnetic head 43, which is supplied through the terminal bolt 50, the lead wire 49 and the terminal pin 48, whereby the magnetic impedance of the electromagnet in said head is continuously measured. Since the cooling water is sprayed over the grinding region, it may be considered that the terminal of the magnetic head is electrically shorted by the water penetrating into the magnetic head mounting socket and the measurement of impedance becomes impossible. In the apparatus of the present invention, however, since the magnetic head holding shaft 11 is oscillated, the water sprayed on the magnetic head flows away under the influence of centrifugal force and not permitted to intrude into the socket. It has been found that merely rotating the holding shaft 11 continuously in one direction is not satisfactory for completely draining the cooling water as the water is drawn into the socket, and a satisfactory water draining effect can be obtained only when the holding shaft 11 is oscillated as in the present invention. A minute quantity of water intruding into the socket block 45 is purged to the outside of said block by the air passing through the water draining slot 52 and the water draining channel 53, and is not permitted to accumulate to a quantity large enough to cause electrical shorting of the terminal of the magnetic head 43.

In the apparatus of the instant invention, as described above, the impedance of the magnetic head 43 is measured continuously during the grinding operation and the grinding operation is automatically stopped by the control circuit when the measured impedance has reached a predetermined value. The control circuit is not specifically shown but may be of any type known in the art, such as that shown in U.S. Pat. No. 3,231,745 to Doubek, Jr., et al., granted Jan. 25, 1966, which may be adopted to control the motor in response to a suitable impedance input signal.

Another feature of the present invention resides in the mechanism for stopping the high speed feeding of the reciprocating table 12. Namely, referring to FIG. 5, when the reciprocating table 12 is advanced upon activating the apparatus, and the switch operating plate 38 actuates the switch 35, the reciprocating table 12 is fed at a relatively low intermediate speed. Thereafter, the reciprocating table 12 is fed as the magnetic head 43 is ground. During this period, the block 36 is advanced relative to the switch operating plate 38, while compressing the spring 40. This is because the frictional force of the holder 33, holding the switch mounting rod 34, is greater than the force to distort the spring 40. The gap A is adjusted to a value substantially equal to the depth of the surface layer to be ground off of the magnetic head 43. Therefore, the grinding operation usually terminates when the gap A becomes zero. However, if wear occurs on the grinding surface of the grinding wheel 10, the amount of travel of the reciprocating table 12 will be come greater than the gap A, and hence will be advanced even after the gap A becomes zero. In this case, the switch operating plate 38 urges the switch mounting rod 34 against the frictional force of the holder 33. Now, when the reciprocating table 12 is in return movement, the switch mounting rod 34 and the switch 35 are retained in their urged positions. Therefore, in the subsequent grinding operation, the fast feed of the reciprocating table is continued to a point closer to the grinding wheel than in the preceding grinding operation. In other words, the reciprocating table 12 is stopped a distance equal to the gap A away from the grinding surface of the grinding wheel. According to the construction of the invention described above, the point where the feeding of the reciprocating table 12 is shifted from the fast feed to the slow feed can be varied depending upon the amount of wear of the grinding wheel 10.

As described above, still another feature of the present invention resides in the fact that the workpiece feed speed is shifted at a suitable time from the intermediate speed at the initiation of the grinding operation to a low finishing speed. By reducing the feed speed at the beginning of the finishing grinding operation, the degree of finishing on the ground surface can be improved and the objectionable phenomena of the gap of the magnetic head being filled with burr can be avoided. In the present invention, the shifting of the feed speed from the intermediate grinding speed to the low finishing speed is controlled by the impedance of the magnetic head 43 being ground. Namely, when the impedance of the magnetic head 43 being worked has reached a predetermined value, the field resistance of the motor 29 is switched and the speed of said motor is reduced.

What is claimed is:

1. An automatic grinding apparatus for magnetic heads, comprising a reciprocating table, a holding shaft having a magnetic head holding portion for holding a magnetic head to be worked rotatably mounted on said reciprocating table and being provided with a magnetic head mounting socket, a rotary grinding wheel arranged in opposed relation to the magnetic head holding portion of said holding shaft, means for advancing said reciprocating table to urge the magnetic head on said holding shaft against said rotary grinding wheel whereby said magnetic head is ground by said grinding wheel, a nozzle for spraying cooling water over the grinding region to remove the heat generated by the grinding operation, means for imparting an oscillation to said holding shaft during the grinding operation and control means by which the impedance of said magnetic head is measured during the grinding operation and the grinding operation is stopped when the impedance of said magnetic head has reached a predetermined value.

2. An automatic grinding apparatus for magnetic heads as defined in claim 1, which further comprises means for controlling the feed speed of said reciprocating table in such a manner that said reciprocating table is fed at a relatively high speed to a point where the magnetic head to be worked mounted on the holding shaft is substantially in contact with the grinding wheel and then fed at a relative low speed from said point for grinding operation, and means for automatically adjusting said point in accordance with the amount of wear of said rotary grinding wheel.

* * * * *